(12) United States Patent
Chen et al.

(10) Patent No.: US 9,586,365 B2
(45) Date of Patent: Mar. 7, 2017

(54) POWDER RECYCLING SYSTEM

(71) Applicant: MICROJET TECHNOLOGY CO., LTD., Hsinchu (TW)

(72) Inventors: Chang-Chih Chen, Hsinchu (TW); Chih-Kai Chen, Hsinchu (TW); Kwo-Yuan Shi, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 93 days.

(21) Appl. No.: 14/684,753

(22) Filed: Apr. 13, 2015

(65) Prior Publication Data
US 2015/0298397 A1 Oct. 22, 2015

(30) Foreign Application Priority Data
Apr. 22, 2014 (TW) .............................. 103114457 A

(51) Int. Cl.
| | |
|---|---|
| *B07B 9/02* | (2006.01) |
| *B29C 67/00* | (2006.01) |
| *B03C 3/017* | (2006.01) |
| *B07B 4/00* | (2006.01) |
| *B33Y 40/00* | (2015.01) |
| *B33Y 10/00* | (2015.01) |

(52) U.S. Cl.
CPC .......... *B29C 67/0096* (2013.01); *B03C 3/017* (2013.01); *B07B 4/00* (2013.01); *B07B 9/02* (2013.01); *B29C 67/0088* (2013.01); *B33Y 10/00* (2014.12); *B33Y 40/00* (2014.12)

(58) Field of Classification Search
CPC ..... B04C 9/00; B04C 2009/001; B03C 3/017; B07B 9/02; B29C 67/0077; B29C 67/0092; B29C 67/0096
See application file for complete search history.

(56) References Cited

U.S. PATENT DOCUMENTS 4,277,260 A * 7/1981 Browning .......... B01D 46/0068
118/326
5,153,028 A * 10/1992 Shutic ................. B05B 15/1211
118/312

(Continued)

*Primary Examiner* — Joseph C Rodriguez
(74) *Attorney, Agent, or Firm* — Kirton McConkie; Evan R. Witt

(57) ABSTRACT

A powder recycling system includes a powder feeder, a remaining powder collector, a bridge breaker, a block powder filter, a cyclone separator, a particulate filter cleaner, an air pressure generation device and an electrostatic precipitator. The powder feeder provides a construction powder to a construction platform. The remaining powder collector for collects the remaining powder. The cyclone separator is used to separate the large-size powdery particles and the small-size powdery particles of the remaining powder from each other through a rotating gaseous stream. The large-size powdery particles fall down to the powder feeder due to gravity, and the small-size powdery particles of the remaining powder is removed from the rotating gaseous stream and transmitted to the particulate filter cleaner. After the small-size powdery particles of the remaining powder are filtered by the particulate filter cleaner, the suspended small-size powdery particles are transmitted to the electrostatic precipitator.

20 Claims, 13 Drawing Sheets

(56) References Cited

U.S. PATENT DOCUMENTS

| | | | |
|---|---|---|---|
| 5,795,359 A * | 8/1998 | McLeish | B01D 46/0067 55/302 |
| 7,686,995 B2 * | 3/2010 | Davidson | B29C 41/12 264/113 |
| 7,971,991 B2 | 7/2011 | Davidson et al. | |
| 7,979,152 B2 * | 7/2011 | Davidson | B29C 67/0077 141/98 |
| 8,827,681 B2 * | 9/2014 | Chen | B08B 5/02 264/113 |
| 2002/0090410 A1 * | 7/2002 | Tochimoto | B29C 67/0081 425/215 |
| 2004/0084814 A1 * | 5/2004 | Boyd | B29C 67/0081 264/497 |
| 2008/0241404 A1 * | 10/2008 | Allaman | B29C 67/0081 427/333 |
| 2010/0192806 A1 * | 8/2010 | Heugel | B29C 67/0096 106/286.1 |
| 2013/0052291 A1 * | 2/2013 | Morikawa | B29C 67/0096 425/135 |
| 2016/0200053 A1 * | 7/2016 | Chen | B29C 67/0096 425/217 |
| 2016/0236422 A1 * | 8/2016 | Sakura | B29C 67/0096 |

\* cited by examiner

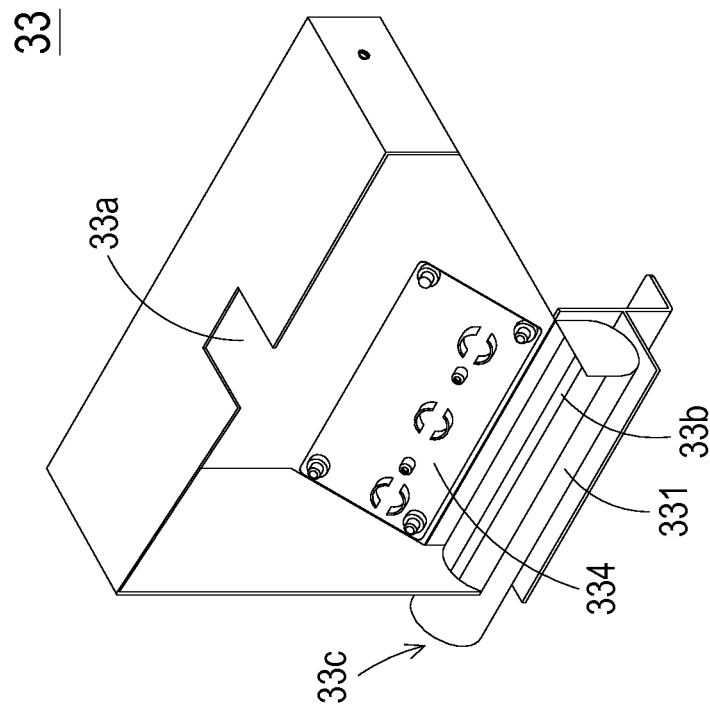
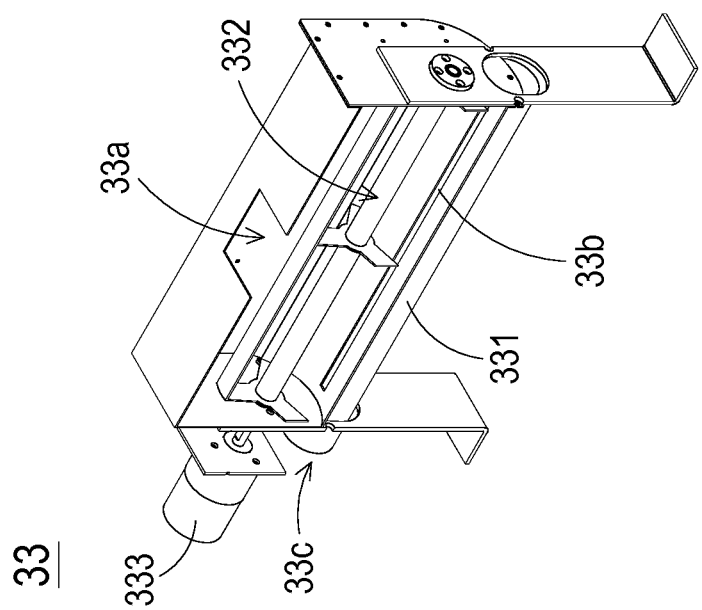
FIG. 6A
FIG. 6B

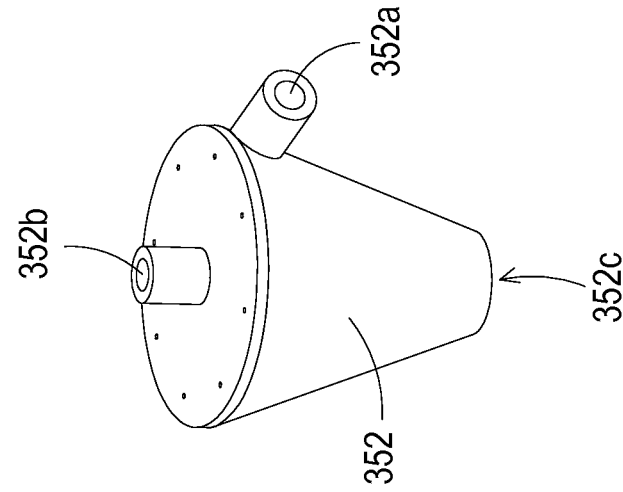
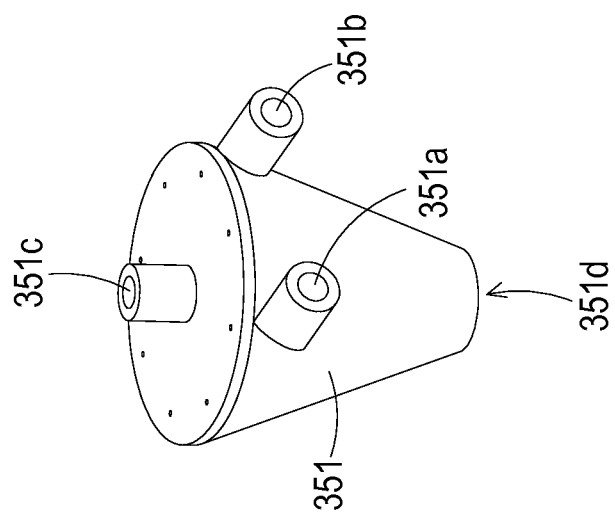
FIG. 8

POWDER RECYCLING SYSTEM

FIELD OF THE INVENTION

The present invention relates to a powder recycling system, and more particularly to a close-type powder recycling system for a three-dimensional object forming apparatus.

BACKGROUND OF THE INVENTION

As known, a rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, rapid prototyping technology develops a method for producing three-dimensional physical models by combining jet printing and precise positioning of carriers. The producing method begins by first spreading a layer of powder on the carrier and then printing high viscosity liquid binder on part of the powder by using jet printing technology, so that the liquid binder and the powder stick together to become solidified. After the above steps are repeatedly done, a three-dimensional physical model is produced by stacking multiple layers.

During the processes of spreading powder, printing and taking out the finished product by the conventional rapid prototyping technology, the flying dust usually pollutes the working environment and contaminates the whole three-dimensional object forming apparatus. For maintaining normal operation, a dust-collecting and cleaning task is frequently done after a specified stage of the rapid prototyping technology. In other words, the three-dimensional object forming apparatus using the conventional rapid prototyping technology is labor-intensive. Moreover, the long-term exposure to the flying dust is harmful to the health of the worker.

Nowadays, for improving the cleanliness of the working environment, a powder processing system for a 3D printer is disclosed. FIG. 1 schematically illustrates the architecture of a conventional powder processing system. This powder processing system is disclosed in U.S. Pat. No. 7,971,991, which is filed by Z Corporation on May 26, 2006. As shown in FIG. 1, the conventional powder processing system 1 comprises a construction chamber 10, two overflow chambers 11, 11', a depowdering chamber 12, a powder container 13, a multi-port valve 14, a hose 15, a powder filter assembly 16 and a dispensing powder container 17.

The excess powder from the construction chamber 10 is collected by the overflow chambers 11 and 11'. After the finished three-dimensional object is cleaned and managed in the depowdering chamber 12, remaining powder is produced. Moreover, new powder is accommodated within the powder container 13. The remaining powder and the new powder are gathered to the multi-port valve 14. Then, by applying a negative pressure, the powder is transmitted to the powder filter assembly 16 through the hose 15. After the powder is filtered by the powder filter assembly 16, the filtered powder is contained in the dispensing powder container 17 so as to be recycled.

Although the conventional powder processing system 1 is capable of recycling the remaining powder or waste powder, there are still some drawbacks. Firstly, by controlling the multi-port valve 14 to switch the airflow path, the powder in the overflow chambers 11, 11', the depowdering chamber 12 and the powder container 13 can be recycled. As known, the use of the multi-port valve 14 increases the control complexity of the powder processing system 1. Moreover, once the multi-port valve 14 has a malfunction, the powder processing system 1 shuts down. Under this circumstance, the process of recycling the powder cannot be successfully done again. Secondly, for transmitting the powder to the powder filter assembly 16 through the multi-port valve 14 and the hose 15 and filtering the powder to the dispensing powder container 17 through the powder filter assembly 16, the speed of the airflow carrying the powder is very high. In other words, the powder carried by the airflow impacts a filter (not shown) of the powder filter assembly 16 at a high speed. Consequently, the filter of the powder filter assembly 16 is readily damaged, and the use life of the powder filter assembly 16 is shortened. Thirdly, for producing the finished three-dimensional object having better binding strength and more delicate surface, the construction powder for forming the three-dimensional object is a mixture containing a fraction of coarse powder and a fraction of fine powder. However, the conventional powder processing system 1 is only capable of recycling the coarse powder from the overflow chambers 11, 11' and the depowdering chamber 12 by a single-step filtering procedure. Consequently, the particle size distribution of the remaining powder is not satisfied. For achieving the optimized recycling efficacy, the powder processing system 1 is equipped with the powder container 13 to supply the new powder to the dispensing powder container 17. After the particle size distribution of the remaining powder of the mixed powder is adjusted to the desired value, the construction powder is produced. Since the new powder needs to be additionally provided, the operating cost is increased.

Therefore, there is a need of providing an improved powder recycling system so as to obviate the above drawbacks.

SUMMARY OF THE INVENTION

A first object of the present invention provides a powder recycling system. The components of the powder recycling system are in communication with each other through corresponding ducts so as to form a close-type powder recycling system. Since it is not necessary to install the multi-port valve to switch the airflow path, the powder recycling system is more user-friendly and cost-effective.

A second object of the present invention provides a powder recycling system for recycling the remaining powder as the construction powder by multiple-steps filtering procedures. After a first filtering procedure is performed by a cyclone separator, about 95% to 99% of the remaining powder is recycled to a powder feeder. After a second filtering procedure is performed, about 1% to 5% of the remaining powder is recycled to the powder feeder. After the third filtering procedure is performed by an electrostatic precipitator, even if the diameters of the small-size powdery particles are very tiny, the small-size powdery particles are retained in the powder recycling system. Consequently, the possibility of causing leakage of flying dust to the surroundings will be minimized and the air quality of the working environment will be enhanced. After the first filtering procedure and the second filtering procedure, the particle size distribution of the remaining powder of the mixed powder is adjusted to the satisfied value, so that the powder recovery rate is enhanced.

A third object of the present invention provides a powder recycling system with a cyclone separator. Due to the buffering effects provided by two cyclone units of the cyclone separator and the rotating gaseous streams within the two cyclone units, the falling speed of the large-size powdery particles will be reduced. Consequently, the possibility of causing damage of the powder container by the falling powder is minimized, and the possibility of disturbing the construction powder of the powder container by the remaining powder from the cyclone separator is also minimized.

A fourth object of the present invention provides a powder recycling system with a remaining powder collector and a bridge breaker. The guiding tank surrounds a construction chamber for collecting the remaining powder from the periphery of the construction chamber. The remaining powder collector has a single collector outlet aligned with a single breaker inlet of the bridge breaker. Since the airflow is centralized to the collector outlet, the remaining powder in the guiding tank can be smoothly transferred to the bridge breaker through the collector outlet and the breaker inlet.

A fifth object of the present invention provides a powder recycling system with a cyclone separator. The duck in communication with a cyclone unit of the cyclone separator comprises an upper section, a lower section and a connector. The upper section and the lower section of the duct are detachably connected with the other through the connector. When the upper section of the duct is detached from the connector, the upper section of the duct is used as a suction pipe. Consequently, the remaining powder floated around the construction platform can be inhaled into the duct. In other words, the powder recycling system of the present invention is effective to recycle the remaining powder or waste powder while enhancing the cleanliness of the working environment. Since the operations of other components of the powder recycling system are not adversely affected by the falling powder, the use life of the powder recycling system is extended.

In accordance with an aspect of the present invention, there is provided a powder recycling system for recycling remaining powder from a construction chamber of a three-dimensional object forming apparatus. The powder recycling system includes a powder feeder, a remaining powder collector, a cyclone separator, a particulate filter cleaner, an air pressure generation device and an electrostatic precipitator. The powder feeder includes a powder container for accommodating a construction powder. The powder feeder includes a first inlet, a second inlet and a powder exhaust port. The construction powder falls down to the construction chamber through the powder exhaust port, so that a constructing process is performed within the construction chamber. The remaining powder collector includes a guiding tank. The guiding tank surrounds the construction chamber for collecting the remaining powder from the construction chamber. A bottom of the guiding tank has a collector outlet. The cyclone separator includes a first cyclone unit and a second cyclone unit. The first cyclone unit includes a first cyclone inlet, a first cyclone outlet and a first powder falling port. The second cyclone unit comprises a second cyclone inlet, a second cyclone outlet and a second powder falling port. The first cyclone inlet is in communication with the collector outlet of the remaining powder collector through a first duct. The first cyclone outlet is in communication with the second cyclone inlet through a second duct. The first powder falling port is in communication with the first inlet of the powder feeder. The second powder falling port is in communication with the second inlet of the powder feeder. The remaining powder from the remaining powder collector is separated into large-size powdery particles and small-size powdery particles by the cyclone separator. The large-size powdery particles fall down to the powder feeder to be recycled as the construction powder. The small-size powdery particles are outputted from the second cyclone outlet. The particulate filter cleaner includes a powder collecting tank, a covering member, a filter net, a cleaner inlet and an airflow channel. The filter net is arranged between the covering member and the powder collecting tank. An upper portion of the powder collecting tank has an airflow conducting space. The cleaner inlet is in communication with the second cyclone outlet of the cyclone separator through a third duct. When a negative pressure airflow is introduced into the airflow channel, the small-size powdery particles of the remaining powder are transmitted from the second cyclone unit to the airflow conducting space through the cleaner inlet and filtered by the filter net, so that portions of the small-size powdery particles are suspended. The air pressure generation device provides the negative pressure airflow, and includes a first airflow port and a second airflow port. The first airflow port is in communication with the airflow channel of the particulate filter cleaner through a fourth duct. The electrostatic precipitator includes a connecting port and a dust collection plate. The connecting port is in communication with the second airflow port of the air pressure generation device through a fifth duct. The suspended small-size powdery particles from the particulate filter cleaner are introduced into the electrostatic precipitator through the connecting port and adsorbed by electrostatic charges on the dust collection plate.

The above contents of the present invention will become more readily apparent to those ordinarily skilled in the art after reviewing the following detailed description and accompanying drawings, in which:

BRIEF DESCRIPTION OF THE DRAWINGS

FIG. 6A is a schematic cutaway view illustrating the bridge breaker of the powder recycling system according to the embodiment of the present invention;

FIG. 6B is a schematic cutaway view illustrating a variant example of the bridge breaker of the powder recycling system according to the embodiment of the present invention;

FIG. 8 is a schematic perspective view illustrating the cyclone separator of the powder recycling system according to the embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
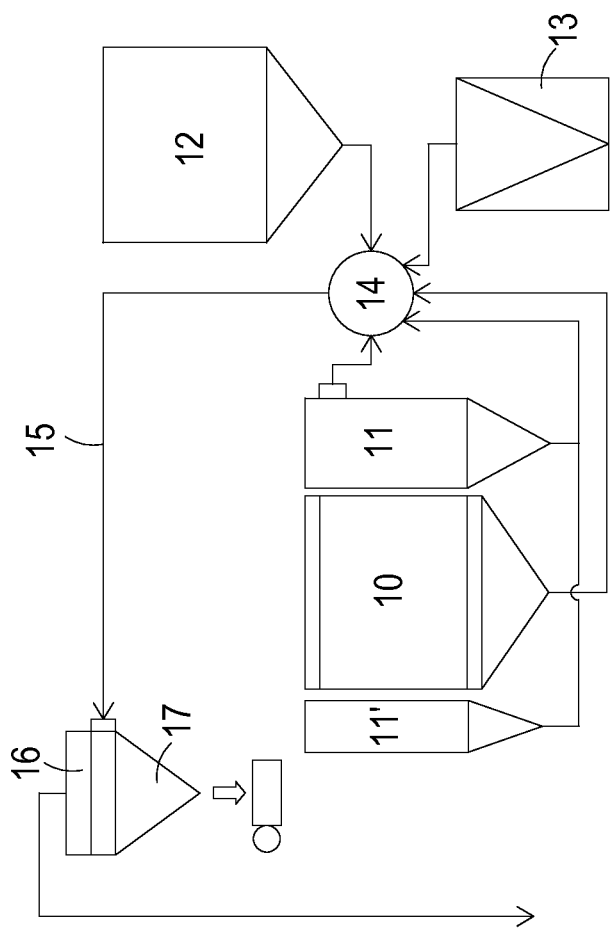
FIG. 1 schematically illustrates the architecture of a conventional powder processing system.
Figure 2:
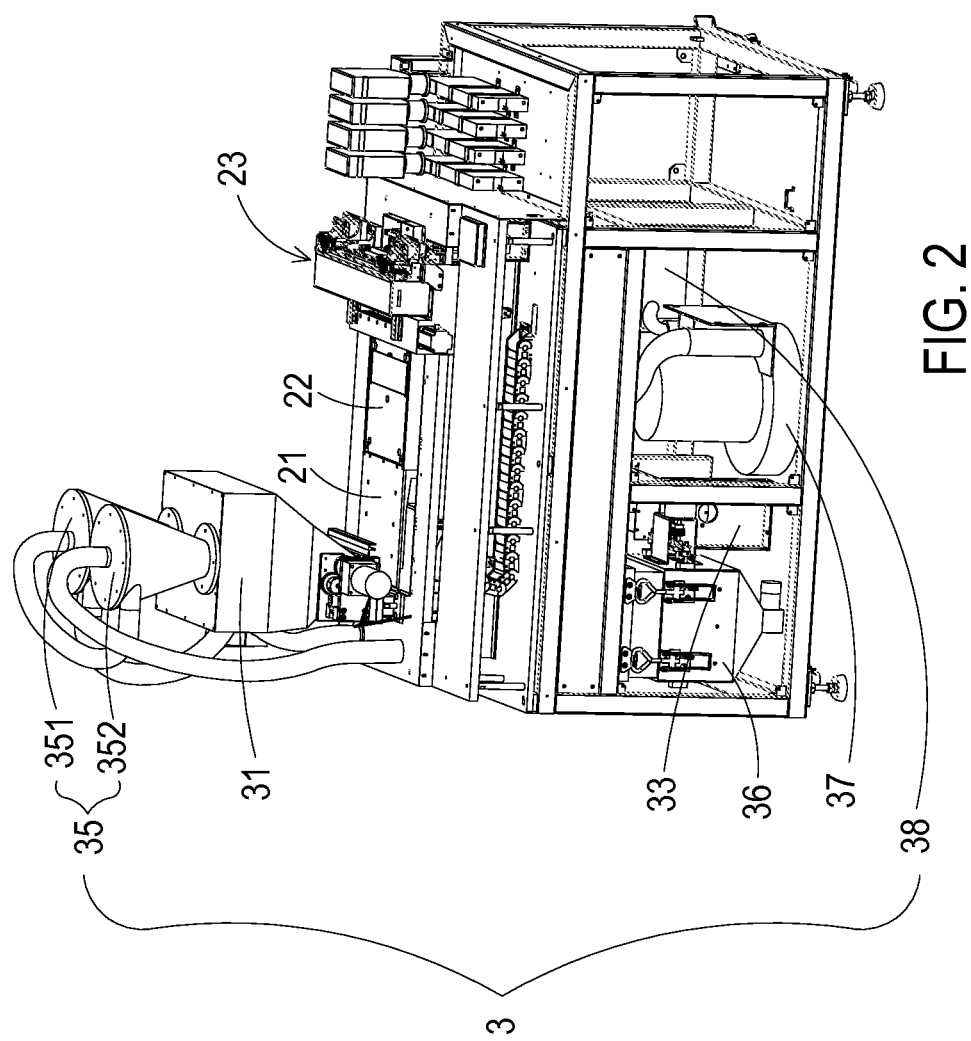
FIG. 2 is a schematic perspective view illustrating a three-dimensional object forming apparatus according to an embodiment of the present invention.
Figure 3:
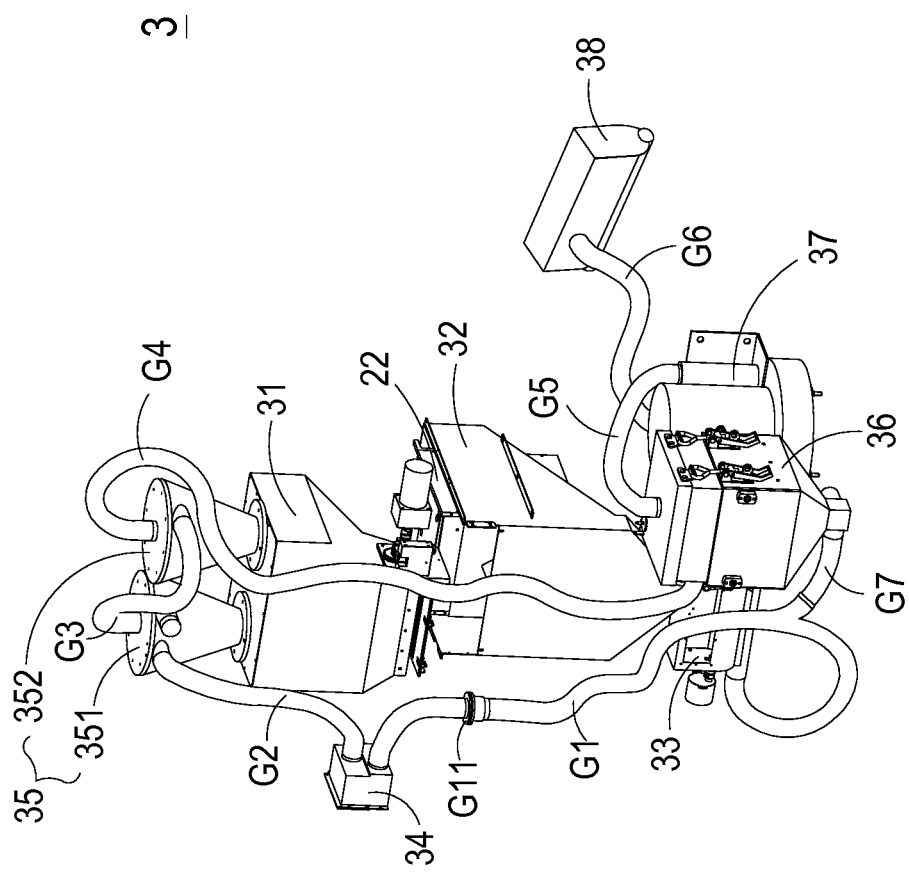
FIG. 3 is a schematic perspective view illustrating a powder recycling system of the three-dimensional object forming apparatus according to the embodiment of the present invention.

FIG. 2 is a schematic perspective view illustrating a three-dimensional object forming apparatus according to an embodiment of the present invention. FIG. 3 is a schematic perspective view illustrating a powder recycling system of the three-dimensional object forming apparatus according to the embodiment of the present invention. Please refer to FIGS. 2 and 3. The three-dimensional object forming apparatus 2 is used for producing a three-dimensional object (not shown). The three-dimensional object forming apparatus 2 comprises a construction platform 21, a construction chamber 22, a printing module 23 and a powder recycling system 3. The powder recycling system 3 comprises a powder feeder 31, a remaining powder collector 32, a bridge breaker 33, a block powder filter 34, a cyclone separator 35, a particulate filter cleaner 36, an air pressure generation device 37 and an electrostatic precipitator 38. These components are in communication with each other through corresponding ducts G1~G7 so as to form a close-type powder recycling system 3.

As shown in FIG. 2, the powder feeder 31 is disposed over the construction platform 21 for accommodating construction powder (not shown) and feeding the construction powder to the construction platform 21. Then, the construction powder on the construction platform 21 is pushed to the construction chamber 22 by a spreading element (not shown), which is linked with the printing module 23. Then, a constructing process is performed to print high viscosity liquid binder on the construction powder by the printing module 23. Consequently, the liquid binder and the powder stick together to become solidified. After the above steps are repeatedly done, a three-dimensional object is produced in the construction chamber 22 by stacking multiple layers. During the constructing process, remaining powder (not shown) is filtered and recycled by the powder recycling system 3.

Moreover, the remaining powder is collected by the remaining powder collector 32, which is disposed under the construction platform 21. Then, the remaining powder is guided downwardly to the bridge breaker 33. After the remaining powder at a collector outlet 32a (see FIG. 5) of the remaining powder collector 32 is actively excluded by the bridge breaker 33, the remaining powder in the remaining powder collector 32 is smoothly guided downwardly to the bridge breaker 33. Then, the remaining powder is transmitted to the block powder filter 34 through the duct G1. After a first filtering procedure is performed by the block powder filter 34, the block-type remaining powder is removed, and the remaining powder with distinct powdery particles is produced and transmitted to the cyclone separator 35 through the duct G2. In this embodiment, the cyclone separator 35 is disposed over the powder feeder 31, and comprises a first cyclone unit 351 and a second cyclone unit 352. The first cyclone unit 351 and the second cyclone unit 352 are in communication with each other through the duct G3. The cyclone separator 35 is used to separate the large-size powdery particles and the small-size powdery particles of the remaining powder from each other through a rotating gaseous stream. In particular, the large-size powdery particles fall down to the powder feeder 31 due to gravity, and the small-size powdery particles of the remaining powder is removed from the rotating gaseous stream and transmitted to the particulate filter cleaner 36 through the duct G4. Consequently, a second filtering procedure is performed by the particulate filter cleaner 36.

Please refer to FIG. 3 again. The particulate filter cleaner 36 is in communication with the air pressure generation device 37 through the duct G5. The air pressure generation device 37 is also in communication with the electrostatic precipitator 38 through the duct G6. The air pressure generation device 37 may be selectively operated in a negative pressure driving mode or a positive pressure driving mode. When the air pressure generation device 37 is operated in the negative pressure driving mode, a negative pressure airflow is generated. Consequently, the remaining powder with the small-size powdery particles is driven to be transmitted from the cyclone separator 35 to the particulate filter cleaner 36. After the small-size powdery particles of the remaining powder are filtered by the particulate filter cleaner 36, portions of the small-size powdery particles are suspended, and the suspended small-size powdery particles are transmitted to the electrostatic precipitator 38. Consequently, a third filtering procedure is performed by the electrostatic precipitator 38. The third filtering procedure is used to filter and adsorb the suspension powder of the remaining powder by electrostatic charges. Moreover, due to the negative pressure airflow, the remaining powder is driven to be transmitted from the bridge breaker 33 to the block powder filter 34 and the cyclone separator 35. In other words, the negative pressure is a main driving force of the powder recycling system 3. On the other hand, when the air pressure generation device 37 is operated in the positive pressure driving mode, a positive pressure airflow is generated. Consequently, the small-size powdery particles of the remaining powder are driven to be transmitted from the particulate filter cleaner 36 to the duct G1 through a bypass duct G7. Under this circumstance, the small-size powdery particles and the distinct powdery particles of the remaining powder are mixed together to be recycled. The components of the powder recycling system 3 will be illustrated as follows in more details.

Figure 4B:
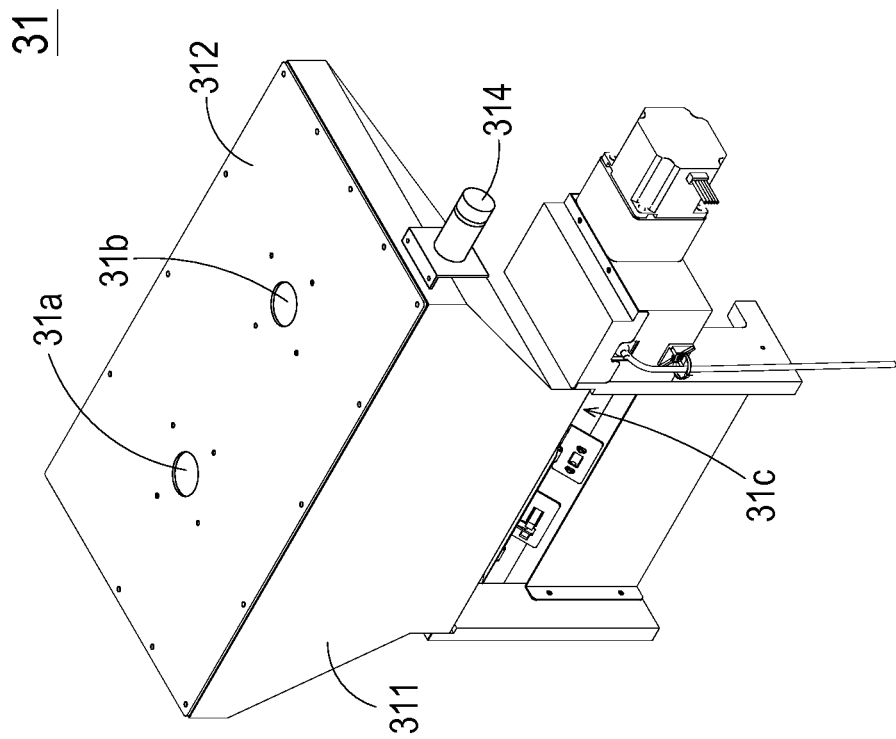
FIG. 4B is a schematic perspective view illustrating a variant example of the powder feeder of the powder recycling system according to the embodiment of the present invention.
Figure 4A:
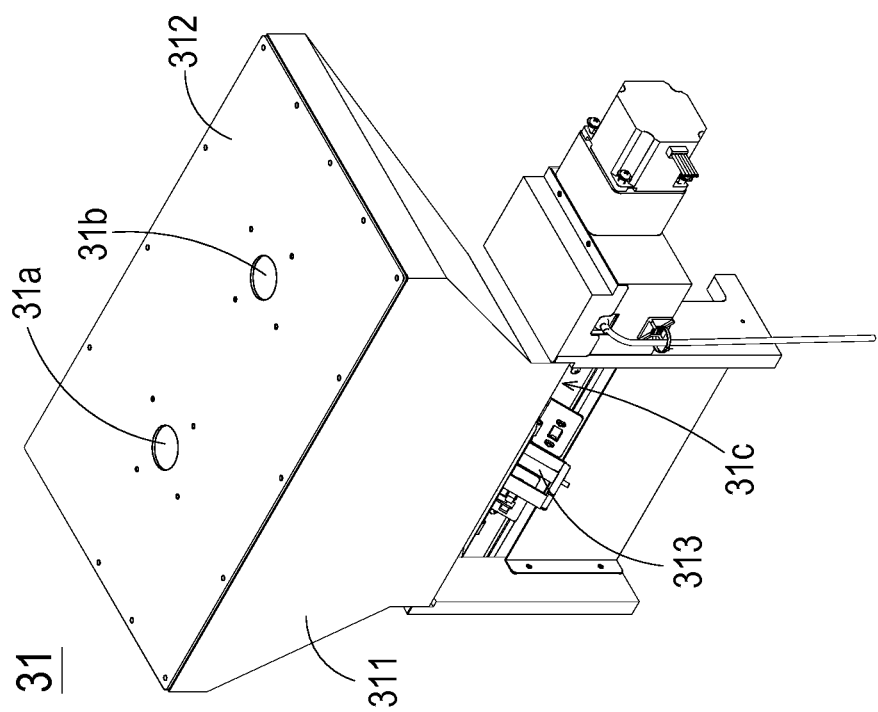
FIG. 4A is a schematic perspective view illustrating the powder feeder of the powder recycling system according to the embodiment of the present invention.

FIG. 4A is a schematic perspective view illustrating the powder feeder of the powder recycling system according to the embodiment of the present invention. Please refer to FIGS. 3 and 4A. The powder feeder 31 is disposed over the construction platform 21 for feeding the construction powder to the construction platform 21 so as to perform the constructing process. In this embodiment, the powder feeder 31 comprises a powder container 311 and a covering plate 312. The powder container 311 is used for accommodating and collecting the construction powder. A bottom of the powder container 311 has a powder exhaust port 31c. The covering plate 312 is disposed over the powder container 311 for sealing the powder container 311. Moreover, the covering plate 312 has a first inlet 31a and a second inlet 31b. The first inlet 31a and the second inlet 31b are connected with the first cyclone unit 351 and the second cyclone unit 352, respectively. After the remaining powder recycled from the cyclone separator 35 is introduced into the powder feeder 31 through the first inlet 31a and the second inlet 31b, the remaining powder is used as the construction powder again. The construction powder is fed to the construction platform 21 through the powder exhaust port 31c, and thus the constructing process is performed.

Optionally, as shown in FIG. 4A, the powder feeder 31 further comprises a weight sensor 313 near the powder exhaust port 31c. The weight sensor 313 is an electronic or mechanical instrument for sensing the weight of the construction powder in the powder container 311. If the weight sensor 313 senses that the weight of the construction powder in the powder container 311 reaches a threshold value, the process of recycling the remaining powder is stopped. FIG. 4B is a schematic perspective view illustrating a variant example of the powder feeder of the powder recycling system according to the embodiment of the present invention. In this embodiment, a motor torque sensor 314 is used to replace the weight sensor 313 of FIG. 4A. The motor torque sensor 314 is located at a lateral side of the powder container 311. If the motor torque sensor 314 senses that the amount of the construction powder in the powder container 311 reaches a threshold value, the process of recycling the remaining powder is stopped. In other words, the arrangement of the weight sensor 313 or the motor torque sensor 314 can effectively control the amount of the construction powder in the powder container 311. It is noted that numerous modifications and alterations may be made while retaining the teachings of the invention.

Figure 5:
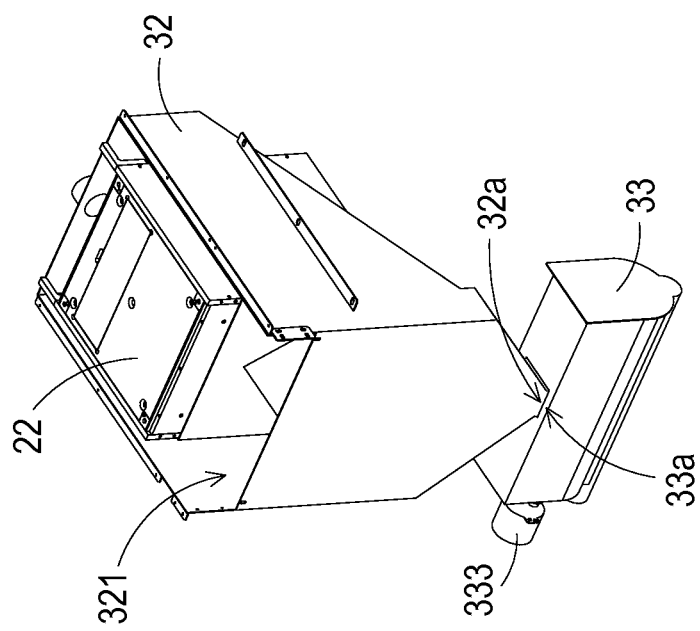
FIG. 5 is a schematic perspective view illustrating the remaining powder collector and the bridge breaker of the powder recycling system according to the embodiment of the present invention.

FIG. 5 is a schematic perspective view illustrating the remaining powder collector and the bridge breaker of the powder recycling system according to the embodiment of the present invention. Please refer to FIGS. 3 and 5. The remaining powder obtained in the constructing process is collected by the remaining powder collector 32, which is disposed under the construction platform 21. The construction chamber 22 is disposed within the remaining powder collector 32. Consequently, the remaining powder will not be leaked to the surroundings, and the remaining powder can be effectively collected. In this embodiment, the remaining powder collector 32 comprises a guiding tank 321. The guiding tank 321 surrounds the construction chamber 22 for collecting the remaining powder from the periphery of the construction chamber 22. Moreover, the lower portion of the guiding tank 321 is a tapered channel from top to bottom. The bottom of the guiding tank 321 has a collector outlet 32a. After the remaining powder collected by the guiding tank 321 is guided to the collector outlet 32a, the remaining powder is further transferred downwardly to the bridge breaker 33.

In this embodiment, the remaining powder collector 32 has the single collector outlet 32a. The collector outlet 32a is aligned with the single breaker inlet 33a of the bridge breaker 33. If the remaining powder collector 32 comprises plural collector outlets 32a and the bridge breaker 33 comprises plural breaker inlets 33a corresponding to the plural collector outlets 32a, the remaining powder cannot be smoothly outputted from the guiding tank 321. In particular, if the suction force applied to one of the plural collector outlets 32a is lower but the suction forces applied to other collector outlets 32a are higher, the airflow cannot be smoothly transferred through the collector outlets 32a corresponding to the lower suction force, and the airflow through all of the plural collector outlets 32a cannot be in equilibrium. Under this circumstance, the remaining powder will not be smoothly outputted from the guiding tank 321, or even the guiding function of the guiding tank 321 will be lost. Since the remaining powder collector 32 has the single collector outlet 32a according to the present invention, the airflow can be centralized to the collector outlet 32a. The remaining powder in the guiding tank 321 is transferred to the bridge breaker 33 through the collector outlet 32a and the breaker inlet 33a.

Please refer to FIGS. 3, 5 and 6A. FIG. 6A is a schematic cutaway view illustrating the bridge breaker of the powder recycling system according to the embodiment of the present invention. As shown in FIG. 5, the breaker inlet 33a of the bridge breaker 33 is in communication with the collector outlet 32a of the remaining powder collector 32. Consequently, the remaining powder from the collector outlet 32a of the remaining powder collector 32 is received by the bridge breaker 33. As shown in FIG. 6A, the bottom of the bridge breaker 33 has a slot 33b. A guiding channel 331 is disposed under the slot 33b. A breaker outlet 33c is located at an end of the guiding channel 331. The breaker outlet 33c is in communication with the duct G1. In this embodiment, the bridge breaker 33 further comprises a rotating lever 332. The rotating lever 332 is disposed within the bridge breaker 33 and located near the slot 33b. Upon rotation of the rotating lever 332, the remaining powder near the slot 33b is loosened and thus the bridge effect of the remaining powder is avoided. Consequently, the remaining powder can be normally outputted from the bridge breaker 33. Moreover, while the remaining powder collected by the remaining powder collector 32 is introduced into the bridge breaker 33 through the collector outlet 32a and the breaker inlet 33a, the rotating lever 332 is driven by a first driving source 333 (e.g., a motor). Consequently, the remaining powder near the slot 33b is loosened by the rotating lever 332, and the bridge effect of the remaining powder near the slot 33b is continuously avoided. Under this circumstance, the remaining powder can smoothly fall down to the guiding channel 331. Then, the remaining powder in the guiding channel 331 is transferred to the duct G1 through the breaker outlet 33c. In other words, even if the remaining powder is continuously introduced into the bridge breaker 33 is capable of eliminating the bridge effect of the breaker inlet 33a.

The way of eliminating the bridge effect is not restricted to the rotating action. FIG. 6B is a schematic cutaway view illustrating a variant example of the bridge breaker of the powder recycling system according to the embodiment of the present invention. In this embodiment, the bridge breaker 33 further comprises a vibrator 334. The vibrator 334 is disposed within the bridge breaker 33 and located near the slot 33b. Upon vibration of the vibrator 334, the remaining powder near the slot 33b is loosened and thus the bridge effect of the remaining powder is avoided. Consequently, the remaining powder can be normally outputted from the bridge breaker 33. Under this circumstance, the remaining powder can smoothly fall down to the guiding channel 331. Then, the remaining powder in the guiding channel 331 is transferred to the duct G1 through the breaker outlet 33c. It is noted that type of the bridge breaker 33 can be varied according to the practical requirements.

Figure 7:
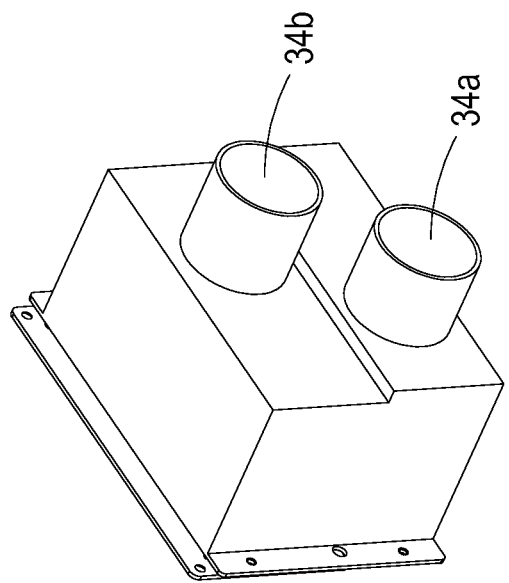
FIG. 7 is a schematic perspective view illustrating the block powder filter of the powder recycling system according to the embodiment of the present invention.

FIG. 7 is a schematic perspective view illustrating the block powder filter of the powder recycling system according to the embodiment of the present invention. Please refer to FIGS. 3 and 7. The block powder filter 34 comprises a filter inlet 34a and a filter outlet 34b. The filter inlet 34a is in communication with the breaker outlet 33c of the bridge breaker 33 through the duct G1. The filter outlet 34b is in communication with the cyclone separator 35 through the duct G2. In this embodiment, a filtering medium (not shown) is disposed within the block powder filter 34 for filtering off the block-type remaining powder. Consequently, the remaining powder with distinct powdery particles is produced and transmitted to the cyclone separator 35 through the duct G2. While the remaining powder from the bridge breaker 33 is introduced into the filter inlet 34a through the duct G1 and filtered by the block powder filter 34, a first filtering procedure is performed. After the first filtering procedure is completed, the block-type remaining powder is filtered off, and the remaining powder with distinct powdery particles is outputted from the filter outlet 34b to the cyclone separator 35.

FIG. 8 is a schematic perspective view illustrating the cyclone separator of the powder recycling system according to the embodiment of the present invention. Please refer to FIGS. 3 and 8. The cyclone separator 35 comprises the first cyclone unit 351 and the second cyclone unit 352. The two cyclone units provide buffering effects to the remaining powder. It is noted that the number of the cyclone units may be varied according to the practical requirements. The first cyclone unit 351 comprises a cyclone inlet 351a, a cyclone outlet 351c and a powder falling port 351d. The second cyclone unit 352 comprises a cyclone inlet 352a, a cyclone outlet 352b and a powder falling port 352c. The powder falling port 351d is located at the bottom of the first cyclone unit 351. The powder falling port 352c is located at the bottom of the second cyclone unit 352. Moreover, the first cyclone unit 351 and the second cyclone unit 352 are installed on the powder feeder 31. In particular, the powder falling port 351d of the first cyclone unit 351 and the powder falling port 352c of the second cyclone unit 352 are in communication with the first inlet 31a and the second inlet 31b of the powder feeder 31, respectively (see also FIG. 4A). The cyclone inlet 351a is located at a lateral side of the first cyclone unit 351, and the cyclone inlet 352a is located at a lateral side of the second cyclone unit 352. The cyclone outlet 351c is located at the top of the first cyclone unit 351, and the cyclone outlet 352b is located at the top of the second cyclone unit 352. The cyclone inlet 351a of the first cyclone unit 351 is in communication with the filter outlet 34b of the block powder filter 34 through the duct G2. The cyclone outlet 351c of the first cyclone unit 351 is in communication with the cyclone inlet 352a of the second cyclone unit 352 through the duct G3. The cyclone outlet 352b of the second cyclone unit 352 is in communication with the particulate filter cleaner 36 through the duct G4. By means of the above connecting mechanism, the first cyclone unit 351 and the second cyclone unit 352 are in communication with the block powder filter 34, the powder feeder 31 and the particulate filter cleaner 36. In some embodiments, the first cyclone unit 351 further comprises an additional cyclone inlet 351b. Normally, the cyclone inlet 351b is closed by a sealing element (not shown). In case that the cyclone inlet 351b is opened, the cyclone inlet 351b is in communication with a powder removable device 4 (see FIG. 13). Under this circumstance, the remaining powder or waste powder from the powder removable device 4 can be also recycled by the powder recycling system 3. That is, the powder recycling system 3 can implement a multiple-tasking operation.

Moreover, the first cyclone unit 351 and the second cyclone unit 352 are cone-shaped cylinders. The areas of the upper portions of the first cyclone unit 351 and the second cyclone unit 352 are larger than the areas of the lower portions of the first cyclone unit 351 and the second cyclone unit 352. When the negative pressure is applied to the cyclone outlet 352b of the second cyclone unit 352 to extract the air of the second cyclone unit 352, a rotating gaseous stream is generated within the second cyclone unit 352. Since the cyclone inlet 352a of the second cyclone unit 352 is in communication with the cyclone outlet 351c of the first cyclone unit 351 through the duct G3, the air of the second cyclone unit 352 is also extracted and a rotating gaseous stream is also generated within the first cyclone unit 351. That is, in response to the negative pressure, the remaining powder with distinct powdery particles (i.e., the remaining powder from the block powder filter 34) is introduced into the first cyclone unit 351 through the duct G2 and the cyclone inlet 351a of the first cyclone unit 351. Moreover, the remaining powder with distinct powdery particles is separated into the large-size powdery particles and the small-size powdery particles by the rotating gaseous streams within the first cyclone unit 351 and the second cyclone unit 352. In particular, the large-size powdery particles fall down to the powder feeder 31 through the powder falling port 351d of the first cyclone unit 351 or the powder falling port 352c of the second cyclone unit 352 due to gravity, and the small-size powdery particles of the remaining powder is removed from the rotating gaseous stream and transmitted to the particulate filter cleaner 36 through the cyclone outlet 352b of the second cyclone unit 352 and the duct G4. Moreover, due to the buffering effects provided by the two cyclone units and the rotating gaseous streams within the two cyclone units, the falling speed of the large-size powdery particles will be reduced. Consequently, the possibility of causing damage of the powder container 311 by the falling powder is minimized, and the possibility of disturbing the construction powder of the powder container 311 by the remaining powder from the cyclone separator 35 is also minimized.

From the above descriptions, the block powder filter 34 and the cyclone separator 35 are sequentially located upstream of the powder feeder 31 for perform the first filtering procedure of filtering the remaining powder. After the remaining powder is transmitted from the remaining powder collector 32 to the block powder filter 34 through the bridge breaker 33 and the duct G1, the block-type remaining powder is filtered off by the block powder filter 34, and the remaining powder with distinct powdery particles is produced and transmitted to the cyclone separator 35 through the duct G2. The cyclone separator 35 is used to separate the large-size powdery particles and the small-size powdery particles of the remaining powder from each other through a rotating gaseous stream. In particular, the large-size powdery particles fall down to the powder feeder 31 due to gravity, and the small-size powdery particles of the remaining powder are removed from the rotating gaseous stream and transmitted to the particulate filter cleaner 36 through the duct G4. Consequently, a second filtering procedure is performed by the particulate filter cleaner 36. In an embodiment, after the first filtering procedure is performed, about 95% to 99% of the remaining powder is recycled to the powder feeder 31. Moreover, the possibility of causing damage of the powder container 311 by the falling powder is minimized, and the possibility of disturbing the construction powder of the powder container 311 by the remaining powder from the cyclone separator 35 is also minimized.

It is noted that numerous modifications and alterations may be made while retaining the teachings of the invention. For example, in some other embodiments, the bridge breaker 33 and/or the block powder filter 34 is not included the powder recycling system 3. If the powder recycling system 3 is not equipped with the bridge breaker 33, the collector outlet 32a of the remaining powder collector 32 is in communication with the block powder filter 34 through the duct G1. After the remaining powder is outputted from the collector outlet 32a of the remaining powder collector 32, the remaining powder is transmitted to the block powder filter 34 through the duct G1. Consequently, the block-type remaining powder is filtered off by the block powder filter 34, and the remaining powder with distinct powdery particles is produced and transmitted to the cyclone separator 35 through the duct G2. On the other hand, if the powder recycling system 3 is not equipped with the block powder filter 34, the bridge breaker 33 is in communication with the cyclone separator 35 through the duct G1. After the remaining powder is outputted from the collector outlet 32a of the remaining powder collector 32 to the cyclone separator 35 through the bridge breaker 33 and the duct G1, the first filtering procedure is performed by the cyclone separator 35. On the other hand, if the powder recycling system 3 is not equipped with the bridge breaker 33 and the block powder filter 34, the collector outlet 32a of the remaining powder collector 32 is in communication with the cyclone separator 35 through the duct G1. After the remaining powder is outputted from the collector outlet 32a of the remaining powder collector 32, the remaining powder is transmitted to the cyclone separator 35 through the duct G1 so as to be recycled by the cyclone separator 35.

Figure 9:
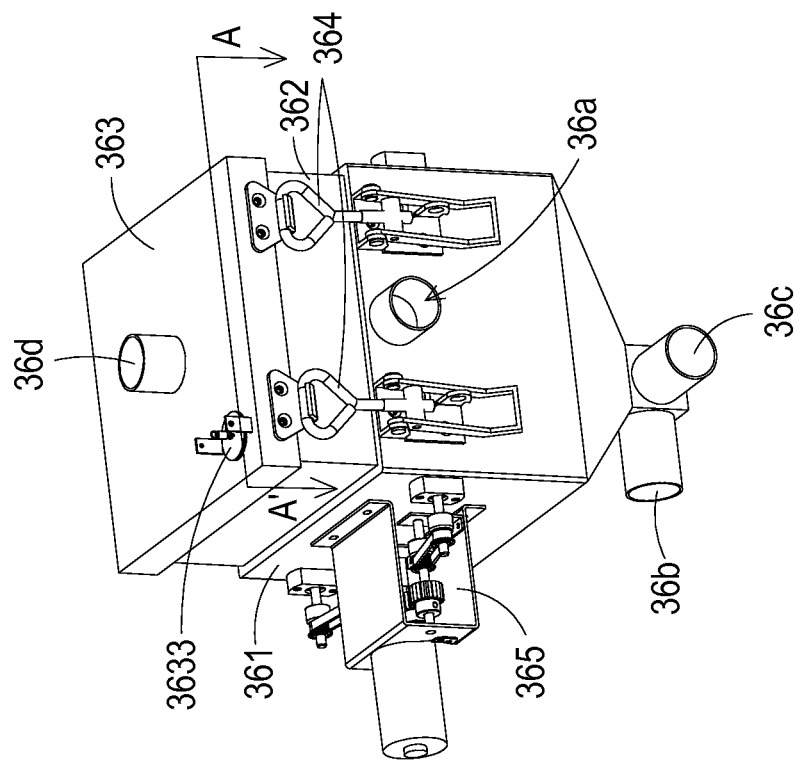
FIG. 9 is a schematic perspective view illustrating the particulate filter cleaner of the powder recycling system according to the embodiment of the present invention.

FIG. 9 is a schematic perspective view illustrating the particulate filter cleaner of the powder recycling system according to the embodiment of the present invention. Please refer to FIGS. 3 and 9. The particulate filter cleaner 36 comprises a covering member 363, a filter net 362 and a powder collecting tank 361. The filter net 362 is arranged between the covering member 363 and the powder collecting tank 361. The covering member 363 and the powder collecting tank 361 are combined together by a clip assembly 364. Consequently, the filter net 362 is clamped and positioned between the covering member 363 and the powder collecting tank 361. The particulate filter cleaner 36 further comprises a cleaner inlet 36a, a cleaner outlet 36b and an airflow channel 36d. The cleaner inlet 36a is located at a lateral side of the powder collecting tank 361. Moreover, as shown in FIG. 3, the cleaner inlet 36a is in communication with the cyclone outlet 352b of the cyclone separator 35 through the duct G4. Consequently, the small-size powdery particles of the remaining powder can be transmitted to the particulate filter cleaner 36 through the duct G4. The cleaner outlet 36b is located at the bottom of the powder collecting tank 361. Moreover, the cleaner outlet 36b is in communication with the duct G1 through the bypass duct G7. Consequently, the small-size powdery particles of the remaining powder can be transmitted from the particulate filter cleaner 36 to the block powder filter 34 through the bypass duct G7 and the duct G1, and the remaining powder is further recycled by the cyclone separator 35. The airflow channel 36d is located at the covering member 363. Moreover, the airflow channel 36d is in communication with the air pressure generation device 37 through the duct G5. In some embodiments, the particulate filter cleaner 36 further comprises a bypass inlet 36c. The bypass inlet 36c is in communication with the cleaner outlet 36b. Normally, the bypass inlet 36c is closed by a sealing element (not shown), and the closed system can be maintained. In case that the bypass inlet 36c is opened, the bypass inlet 36c is in communication with a powder removable device 4 (see FIG. 13). Under this circumstance, the remaining powder or waste powder from the powder removable device 4 can be also recycled by the powder recycling system 3. That is, the powder recycling system 3 can implement a multiple-tasking operation.

Figure 10:
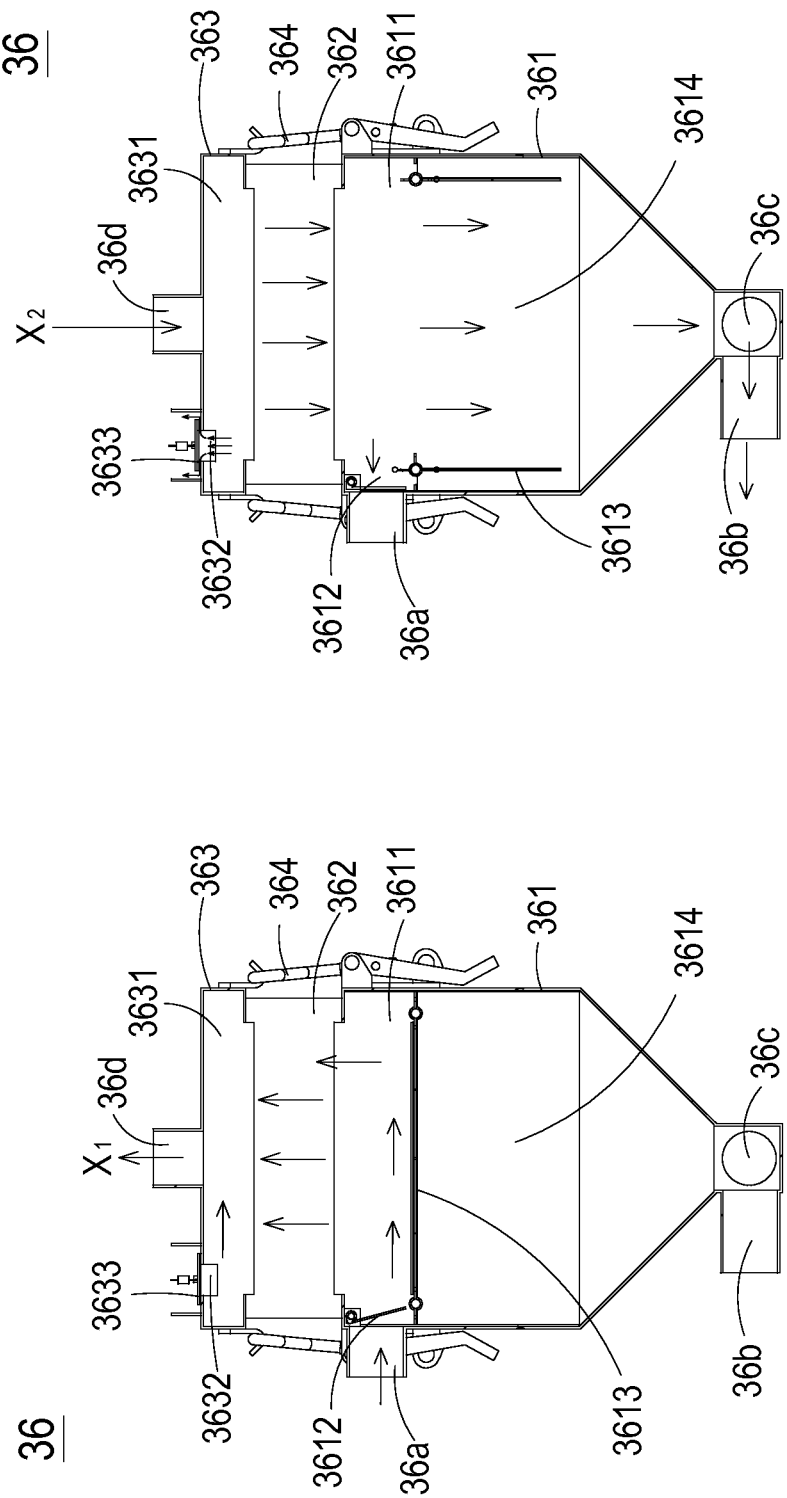
FIG. 10A is a schematic perspective view illustrating the particulate filter cleaner of FIG. 9 and taken along the line A-A', wherein the powder recycling system is operated in a negative pressure driving mode.
FIG. 10B is a schematic perspective view illustrating the particulate filter cleaner of FIG. 9 and taken along the line A-A', wherein the powder recycling system is operated in a positive pressure driving mode.

FIG. 10A is a schematic perspective view illustrating the particulate filter cleaner of FIG. 9 and taken along the line A-A', wherein the powder recycling system is operated in a negative pressure driving mode. FIG. 10B is a schematic perspective view illustrating the particulate filter cleaner of FIG. 9 and taken along the line A-A', wherein the powder recycling system is operated in a positive pressure driving mode. As shown in FIGS. 10A and 10B, an upper portion of the powder collecting tank 361 has an airflow conducting space 3611. The cleaner inlet 36a is selectively in communication with the airflow conducting space 3611. Moreover, a check valve 3612 is located at the junction between the cleaner inlet 36a and the airflow conducting space 3611. The check valve 3612 is a valve that normally allows the remaining powder to pass through it in only one direction. In particular, the check valve 3612 is selectively opened or close according to the pressure difference between the cleaner inlet 36a and the airflow conducting space 3611. If the pressure of the airflow at the cleaner inlet 36a is higher than the pressure of the airflow in the airflow conducting space 3611, the check valve 3612 is in an open state (see FIG. 10A). Under this circumstance, the cleaner inlet 36a is in communication with the airflow conducting space 3611. Whereas, if the pressure of the airflow at the cleaner inlet 36a is lower than the pressure of the airflow in the airflow conducting space 3611, the check valve 3612 is in a close state (see FIG. 10B). Under this circumstance, the airflow within the airflow conducting space 3611 cannot be leaked out of the cleaner inlet 36a. Moreover, a door plate assembly 3613 is disposed under the airflow conducting space 3611 of the powder collecting tank 361. When the door plate assembly 3613 is driven by a second driving source 365 (see FIG. 9), the door plate assembly 3613 is selectively rotated in the direction toward the airflow conducting space 3611 or in the direction away from the airflow conducting space 3611. An example of the second driving source 365 includes but is not limited to a motor. In this embodiment, the door plate assembly 3613 comprises two door plates. The first ends of the two door plates are pivotally coupled to two opposite inner walls of the powder collecting tank 361, respectively.

If the door plate assembly 3613 is in a close state (see FIG. 10A), the two door plates are coplanar to seal the bottom of the airflow conducting space 3611. Under this circumstance, the airflow conducting space 3611 is not in communication with the underlying powder collecting space 3614. If the two door plates are rotated downwardly and the door plate assembly 3613 is in an open state (see FIG. 10B), the airflow conducting space 3611 is in communication with the underlying powder collecting space 3614. Under this circumstance, the small-size powdery particles of the remaining powder can fall down from the airflow conducting space 3611 to the cleaner outlet 36b through the powder collecting space 3614.

Please refer to FIGS. 10A and 10B again. The filter net 362 is arranged between the covering member 363 and the powder collecting tank 361. That is, the filter net 362 is disposed over the airflow conducting space 3611. After the covering member 363 is disposed over the filter net 362, the particulate filter cleaner of the present invention is assembled. In this embodiment, an airflow conducting gap 3631 is formed within the covering member 363, and an airflow exhaust valve 3632 and the airflow channel 36d are located at the top of the covering member 363. The airflow exhaust valve 3632 and the airflow channel 36d are in communication with the airflow conducting gap 3631. Moreover, a filtering medium (not shown) is disposed within the airflow exhaust valve 3632 for filtering the suspended small-size powdery particles of the remaining powder. Consequently, the suspended small-size powdery particles of the remaining powder cannot be leaked out of the airflow exhaust valve 3632. Moreover, an elastic suppressor 3633 is located at the top of the airflow exhaust valve 3632. The elastic suppressor 3633 is selectively closed or opened in the negative pressure driving mode or the positive pressure driving mode.

Please refer to FIG. 10A again. As mentioned above, the airflow channel 36d is located at the covering member 363. Moreover, the airflow channel 36d is in communication with the air pressure generation device 37 through the duct G5. When the air pressure generation device 37 is operated in the negative pressure driving mode, the negative pressure airflow is generated. Due to the negative pressure airflow, a suction force is applied to the airflow channel 36d. Consequently, as shown in FIG. 10A, the negative pressure airflow flows along the path X1. At the same time, the door plate assembly 3613 is closed by the second driving source 365 so as to seal the bottom of the airflow conducting space 3611. Under this circumstance, the airflow conducting space 3611 is not in communication with the underlying powder collecting space 3614. Moreover, since the pressure of the negative pressure airflow is lower than the ambient pressure, the elastic suppressor 3633 is closed and the airflow cannot be leaked out of the airflow exhaust valve 3632. Moreover, in response to the suction force of the negative pressure airflow, the check valve 3612 is in the open state. Under this circumstance, the cleaner inlet 36a is in communication with the airflow conducting space 3611. Consequently, the remaining powder with the small-size powdery particles is introduced into the airflow conducting space 3611 through the cleaner inlet 36a and filtered by the filter net 362. After the small-size powdery particles of the remaining powder are filtered by the filter net 362, the suspended small-size powdery particles are transmitted to the electrostatic precipitator 38.

On the other hand, when the air pressure generation device 37 is operated in the positive pressure driving mode, the positive pressure airflow is generated. Consequently, as shown in FIG. 10B, the positive pressure airflow flows along the path X2. Moreover, after the positive pressure airflow is introduced into the airflow conducting gap 3631 of the covering member 363 through the airflow channel 36d, the positive pressure airflow can backwash the filter net 362. At the same time, the door plate assembly 3613 is opened by the second driving source 365, so that the airflow conducting space 3611 is in communication with the underlying powder collecting space 3614. Moreover, since the pressure of the positive pressure airflow is higher than the ambient pressure, the elastic suppressor 3633 is opened and the airflow can be leaked out of the airflow exhaust valve 3632. Moreover, in response to the positive pressure airflow, the check valve 3612 is in the close state. Under this circumstance, the cleaner inlet 36a is not in communication with the airflow conducting space 3611.

In particular, due to the positive pressure airflow, the small-size powdery particles of the remaining powder adsorbed by the filter net 362 are pushed down to the cleaner outlet 36b through the powder collecting space 3614 and the airflow conducting space 3611. Consequently, the small-size powdery particles of the remaining powder can be transmitted from the particulate filter cleaner 36 to the block powder filter 34 through the bypass duct G7 and the duct G1. Under this circumstance, the small-size powdery particles and the distinct powdery particles of the remaining powder are mixed together to be recycled. Since the particle size distribution of the remaining powder of the mixed powder is adjusted to the satisfied value, the powder recovery rate is enhanced.

Figure 11:
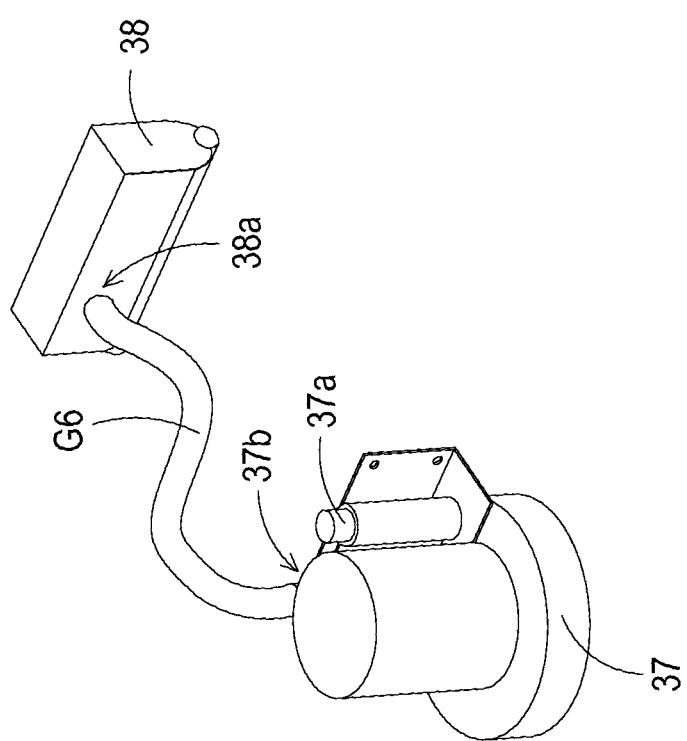
FIG. 11 is a schematic perspective view illustrating the air pressure generation device and the electrostatic precipitator of the powder recycling system according to the embodiment of the present invention.

FIG. 11 is a schematic perspective view illustrating the air pressure generation device and the electrostatic precipitator of the powder recycling system according to the embodiment of the present invention. Please refer to FIGS. 3 and 11. An example of the air pressure generation device 37 includes but is not limited to a blower. The air pressure generation device 37 is used to provide the negative pressure airflow or the positive pressure airflow. In this embodiment, the air pressure generation device 37 comprises a first airflow port 37a and a second airflow port 37b. As shown in FIG. 3, the first airflow port 37a is in communication with the airflow channel 36d of the particulate filter cleaner 36 through the duct G5. The second airflow port 37b is in communication with the electrostatic precipitator 38 through the duct G6. When the air pressure generation device 37 is operated in the negative pressure driving mode, a suction force is applied to the airflow channel 36d of the particulate filter cleaner 36. After the small-size powdery particles of the remaining powder are filtered by the particulate filter cleaner 36, the suspended small-size powdery particles are transmitted to the air pressure generation device 37 through the duct G5 and then transmitted to the electrostatic precipitator 38 through the second airflow port 37b and the duct G6. Consequently, a third filtering procedure is performed by the electrostatic precipitator 38. The third filtering procedure is used to filter and adsorb the suspension powder of the remaining powder by electrostatic charges.

That is, as shown in FIG. 3, when the air pressure generation device 37 provides the negative pressure airflow, the suction force is applied to the airflow channel 36d of the particulate filter cleaner 36. Under this circumstance, the negative pressure airflow is transmitted through the particulate filter cleaner 36, the duct G5, the air pressure generation device 37 and the electrostatic precipitator 38 and outputted from the electrostatic precipitator 38. At the same time, the closed duct system of the powder recycling system 3 have a negative pressure. In response to the negative pressure airflow, the small-size powdery particles of the remaining powder are transmitted from the cyclone separator 35 to the particulate filter cleaner 36 through the duct G4. After the small-size powdery particles of the remaining powder are filtered by the particulate filter cleaner 36, the suspended small-size powdery particles are transmitted to the air pressure generation device 37 through the duct G5 and then transmitted to the electrostatic precipitator 38 through the duct G6. Consequently, the third filtering procedure is used to filter and adsorb the suspension powder of the remaining powder by electrostatic charges. Moreover, in response to the negative pressure airflow, the remaining powder in the remaining powder collector 32 is driven to fall down to the bridge breaker 33, and the remaining powder is driven to be transmitted to the block powder filter 34 through the duct G1. After the first filtering procedure is performed by the block powder filter 34, the block-type remaining powder is removed, and the remaining powder with distinct powdery particles is produced. In response to the negative pressure airflow, the remaining powder with distinct powdery particles is driven to be transmitted to the cyclone separator 35 through the duct G2. In other words, the negative pressure is a main driving force of the powder recycling system 3.

On the other hand, when the air pressure generation device 37 is operated in the positive pressure driving mode, the positive pressure airflow is transmitted to the air pressure generation device 37 through the electrostatic precipitator 38 and then transmitted to the particulate filter cleaner 36 through the duct G5. In response to the positive pressure airflow, the small-size powdery particles of the remaining powder in the particulate filter cleaner 36 are transmitted to the duct G1 through the cleaner outlet 36*b* and the bypass duct G7.

Please refer to FIGS. 3 and 11 again. The electrostatic precipitator 38 comprises a connecting port 38*a*. The connecting port 38*a* is in communication with the second airflow port 37*b* of the air pressure generation device 37 through the duct G6. Consequently, the third filtering procedure is performed by the electrostatic precipitator 38. Moreover, an electrostatic adsorption assembly (not shown) is disposed within the electrostatic precipitator 38. The electrostatic adsorption assembly at least comprises a dust collection plate (not shown). When a voltage is applied to the electrostatic adsorption assembly, electrostatic charges are accumulated on the dust collection plate to adsorb the suspended small-size powdery particles from the particulate filter cleaner 36. When the air pressure generation device 37 provides the negative pressure airflow, the suction force is applied to the airflow channel 36*d* of the particulate filter cleaner 36. After the small-size powdery particles of the remaining powder are filtered by the particulate filter cleaner 36, the suspended small-size powdery particles are transmitted to the air pressure generation device 37 through the duct G5 and then transmitted to the electrostatic precipitator 38 through the duct G6. Since electrostatic charges are accumulated on the dust collection plate, the suspended small-size powdery particles are adsorbed on the dust collection plate. Under this circumstance, the third filtering procedure is performed by the electrostatic precipitator 38. Consequently, even if the diameters of the small-size powdery particles are very tiny, the small-size powdery particles are retained in the powder recycling system 3. That is, the possibility of causing leakage of flying dust to the surroundings will be minimized and the air quality of the working environment will be enhanced. On the other hand, when the air pressure generation device 37 provides the positive pressure airflow, the voltage is not applied to the electrostatic adsorption assembly of the electrostatic precipitator 38. Consequently, no electrostatic charges are accumulated on the dust collection plate.

As mentioned above, the first cyclone unit 351 and the second cyclone unit 352 of the cyclone separator 35 of the powder recycling system 3 provide buffering effects to the remaining powder. Consequently, about 95% to 99% of the remaining powder is recycled to the powder feeder 31 at a slower speed. Moreover, due to the buffering effects provided by the two cyclone units and the rotating gaseous streams within the two cyclone units, the falling speed of the large-size powdery particles will be reduced. Consequently, the possibility of causing damage of the powder container 311 by the falling powder is minimized, and the possibility of disturbing the construction powder of the powder container 311 by the remaining powder from the cyclone separator 35 is also minimized. Moreover, due to the rotating gaseous streams within the two cyclone units, the small-size powdery particles of the remaining powder are removed from the rotating gaseous stream and transmitted to the particulate filter cleaner 36 through the cyclone outlet 351*c* of the first cyclone unit 351 and the cyclone outlet 352*b* of the second cyclone unit 352. Consequently, the second filtering procedure is performed by the particulate filter cleaner 36. Moreover, since the cleaner outlet 36*b* of the particulate filter cleaner 36 is in communication with the duct G1 through the bypass duct G7, the small-size powdery particles of the remaining powder can be transmitted to the duct G1 and further recycled. Moreover, after the second filtering procedure is performed, about 1% to 5% of the remaining powder is recycled to the powder feeder 31. In other words, after the first filtering procedure and the second filtering procedure are performed, the about 99% to 100% of the remaining powder is recycled to the powder feeder 31. Moreover, the third filtering procedure is performed by the electrostatic precipitator 38. Consequently, even if the diameters of the small-size powdery particles are very tiny, the small-size powdery particles are retained in the powder recycling system 3. That is, the possibility of causing leakage of flying dust to the surroundings will be minimized and the air quality of the working environment will be enhanced. Moreover, since the particle size distribution of the remaining powder of the mixed powder is adjusted to the satisfied value, the powder recovery rate is enhanced.

Figure 12:
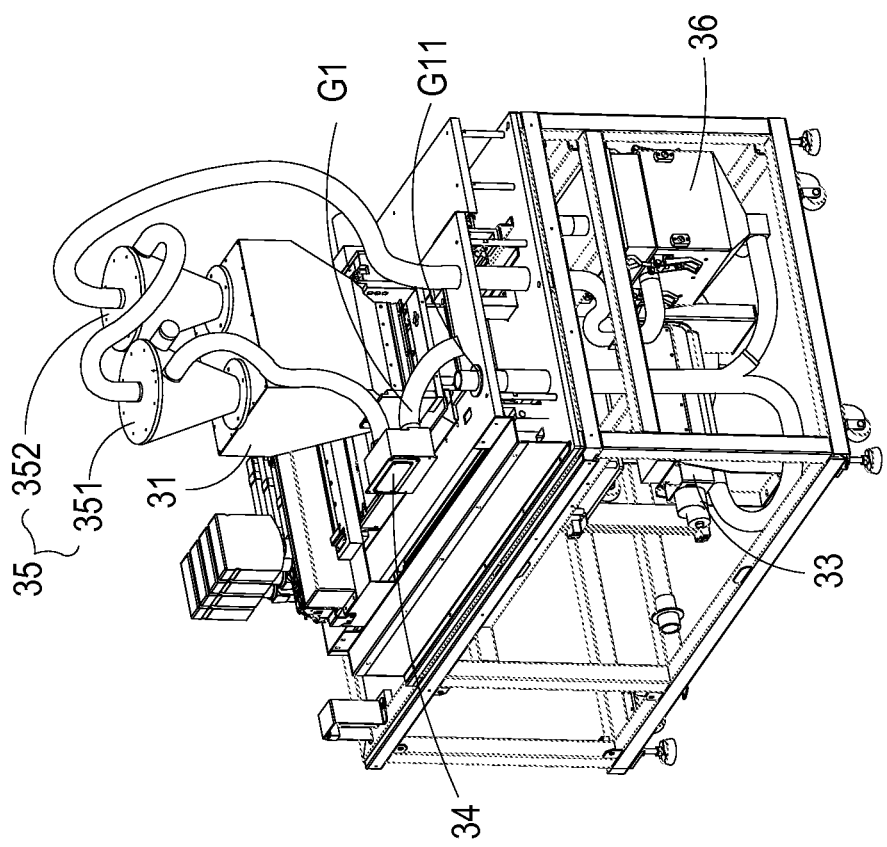
FIG. 12 is a schematic perspective view illustrating the three-dimensional object forming apparatus of FIG. 2, in which an upper section of the duct G1 of the powder recycling system is detached from a connector G11.

FIG. 12 is a schematic perspective view illustrating the three-dimensional object forming apparatus of FIG. 2, in which an upper section of the duct G1 of the powder recycling system is detached from a connector G11. In this embodiment, the duct G1 comprises an upper section and a lower section. Normally, the upper section and the lower section of the duct G1 are combined together through a connector G11. Due to the arrangement of the connector G11, the upper section of the duct G1 is detachable connected with the lower section of the duct G1. When the upper section of the duct G1 is detached from the connector G11, the upper section of the duct G1 is used as a suction pipe because the upper section of the duct G1 has the negative pressure. Consequently, the remaining powder floated around the construction platform 21 can be inhaled into the duct G1 in response to the negative pressure airflow. Under this circumstance, the cleanliness of the working environment is enhanced, and the operations of other components of the powder recycling system 3 are not adversely affected by the falling powder. Consequently, the use life of the powder recycling system 3 is extended. It is noted that numerous modifications and alterations may be made while retaining the teachings of the invention. For example, in some other embodiment, the duct G2 comprises an upper section and a lower section, wherein the upper section and the lower section of the duct G2 are detachably connected with the other through the connector G11.

Figure 13:
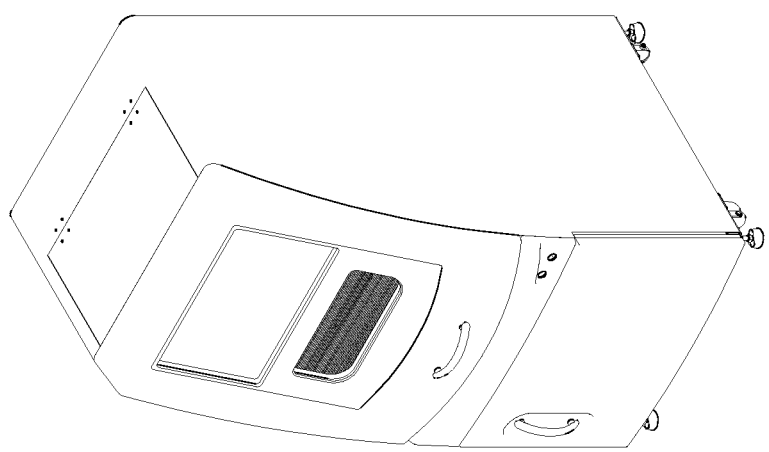
FIG. 13 schematically illustrates a powder removable device in communication with the powder recycling system according to the embodiment of the present invention.

Moreover, the applications of the powder recycling system 3 may be expanded. For example, as shown in FIG. 13, the powder recycling system 3 is in communication with a powder removable device 4. In an embodiment, as shown in FIG. 8, the powder removable device 4 is in communication with the additional cyclone inlet 351b of the first cyclone unit 351 of the cyclone separator 35 through an additional duct (not shown). In another embodiment, as shown in FIG. 9, the powder removable device 4 is in communication with the bypass inlet 36c of the particulate filter cleaner 36. Under this circumstance, the remaining powder or waste powder from the powder removable device 4 can be also recycled by the powder recycling system 3. That is, the powder recycling system 3 can implement a multiple-tasking operation.

From the above descriptions, the present invention provides a powder recycling system. The powder recycling system comprises a powder feeder, a remaining powder collector, a bridge breaker, a block powder filter, a cyclone separator, a particulate filter cleaner, an air pressure generation device and an electrostatic precipitator. These components are in communication with each other through corresponding ducts so as to form a close-type powder recycling system. Since it is not necessary to install the multi-port valve to switch the airflow path, the powder recycling system is more user-friendly. Moreover, the powder recycling system is effective to recycle the remaining powder as the construction powder by multiple filtering procedures. After the filtering procedure is performed by the block powder filter, the block-type remaining powder is removed, and the remaining powder with distinct powdery particles is produced. The cyclone separator is used to separate the large-size powdery particles and the small-size powdery particles of the remaining powder from each other through a rotating gaseous stream. The large-size powdery particles fall down to the powder feeder due to gravity, and the small-size powdery particles of the remaining powder is removed from the rotating gaseous stream and transmitted to the particulate filter cleaner. After the small-size powdery particles of the remaining powder are filtered by the particulate filter cleaner, the suspended small-size powdery particles are transmitted to the electrostatic precipitator. Moreover, the small-size powdery particles of the remaining powder can be transmitted from the particulate filter cleaner to the cyclone separator through the bypass duct and the corresponding ducts. Under this circumstance, the small-size powdery particles and the distinct powdery particles of the remaining powder are mixed together to be recycled. Since the particle size distribution of the remaining powder of the mixed powder is adjusted to the satisfied value, the powder recovery rate is enhanced. Moreover, due to the buffering effects provided by the two cyclone units and the rotating gaseous streams within the two cyclone units, the falling speed of the large-size powdery particles will be reduced. Consequently, the possibility of causing damage of the powder container by the falling powder is minimized, and the possibility of disturbing the construction powder of the powder container by the remaining powder from the cyclone separator is also minimized. Due to the electrostatic precipitator, even if the diameters of the small-size powdery particles are very tiny, the small-size powdery particles are retained in the powder recycling system. That is, the possibility of causing leakage of flying dust to the surroundings will be minimized and the air quality of the working environment will be enhanced. Moreover, when the upper section of the duct G1 is detached from the connector, the upper section of the duct G1 is used as a suction pipe. Consequently, the remaining powder floated around the construction platform can be inhaled into the duct. In other words, the powder recycling system of the present invention is effective to recycle the remaining powder or waste powder while enhancing the cleanliness of the working environment. Since the worker operates the three-dimensional object forming apparatus in the clean working environment without flying dust, the influence of the flying dust on the health of the worker will be minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A powder recycling system for recycling remaining powder from a construction chamber of a three-dimensional object forming apparatus, the powder recycling system comprising:
   a powder feeder comprising a powder container for accommodating a construction powder, wherein the powder feeder comprises a first inlet, a second inlet and a powder exhaust port, wherein the construction powder falls down to the construction chamber through the powder exhaust port, so that a constructing process is performed within the construction chamber;
   a remaining powder collector comprising a guiding tank, wherein the guiding tank surrounds the construction chamber for collecting the remaining powder from the construction chamber, wherein a bottom of the guiding tank has a collector outlet;
   a cyclone separator comprising a first cyclone unit and a second cyclone unit, wherein the first cyclone unit comprises a first cyclone inlet, a first cyclone outlet and a first powder falling port, and the second cyclone unit comprises a second cyclone inlet, a second cyclone outlet and a second powder falling port, wherein the first cyclone inlet is in communication with the collector outlet of the remaining powder collector through a first duct, the first cyclone outlet is in communication with the second cyclone inlet through a second duct, the first powder falling port is in communication with the first inlet of the powder feeder, and the second powder falling port is in communication with the second inlet of the powder feeder, wherein the remaining powder from the remaining powder collector is separated into large-size powdery particles and small-size powdery particles by the cyclone separator, the large-size powdery particles fall down to the powder feeder to be recycled as the construction powder, and the small-size powdery particles are outputted from the second cyclone outlet;
   a particulate filter cleaner comprising a powder collecting tank, a covering member, a filter net, a cleaner inlet and an airflow channel, wherein the filter net is arranged between the covering member and the powder collecting tank, an upper portion of the powder collecting tank has an airflow conducting space, and the cleaner inlet is in communication with the second cyclone outlet of the cyclone separator through a third duct, wherein when a negative pressure airflow is introduced into the airflow channel, the small-size powdery particles of the remaining powder are transmitted from the second cyclone unit to the airflow conducting space through the cleaner inlet and filtered by the filter net, so that portions of the small-size powdery particles are suspended;

an air pressure generation device providing the negative pressure airflow, and comprising a first airflow port and a second airflow port, wherein the first airflow port is in communication with the airflow channel of the particulate filter cleaner through a fourth duct; and an electrostatic precipitator comprising a connecting port and a dust collection plate, wherein the connecting port is in communication with the second airflow port of the air pressure generation device through a fifth duct, wherein the suspended small-size powdery particles from the particulate filter cleaner are introduced into the electrostatic precipitator through the connecting port and adsorbed by electrostatic charges on the dust collection plate.

2. The powder recycling system according to claim 1, wherein the powder recycling system further comprises a bridge breaker, and the bridge breaker comprises a breaker inlet and a breaker outlet, wherein the breaker inlet is in communication with the collector outlet of the remaining powder collector, and the breaker outlet is in communication with the first duct, wherein a bridge effect of the remaining powder from the collector outlet is eliminated by the bridge breaker, so that the remaining powder is smoothly transferred to the cyclone separator through the breaker outlet and the first duct.

3. The powder recycling system according to claim 2, wherein the bridge breaker further comprises a rotating lever, and the rotating lever is disposed within the bridge breaker, wherein upon rotation of the rotating lever, the remaining powder within the bridge breaker is loosened so as to be smoothly outputted from the breaker outlet.

4. The powder recycling system according to claim 2, wherein the bridge breaker further comprises a vibrator, and the vibrator is disposed within the bridge breaker, wherein upon vibration of the vibrator, the remaining powder within the bridge breaker is loosened so as to be smoothly outputted from the breaker outlet.

5. The powder recycling system according to claim 1, wherein the particulate filter cleaner comprises:
   a cleaner outlet located at a bottom of the powder collecting tank, wherein the cleaner outlet is in communication with the first duct through a bypass duct;
   a check valve located at a junction between the cleaner inlet and the airflow conducting space, wherein the check valve is selectively opened or closed according to a pressure difference between the cleaner inlet and the airflow conducting space;
   a door plate assembly disposed within the powder collecting tank, wherein if the door plate assembly is in a close state, the airflow conducting space is not in communication with the cleaner outlet, wherein if the door plate assembly is in an open state, the airflow conducting space is in communication with the cleaner outlet; and
   an airflow exhaust valve located at a top of the covering member and comprising a filtering medium, wherein the airflow exhaust valve and the airflow channel are in communication with an airflow conducting gap of the covering member, and the suspended small-size powdery particles of the remaining powder are filtered by the filtering medium and not leaked out of the airflow exhaust valve, wherein an elastic suppressor is located at a top of the airflow exhaust valve,
   wherein when the negative pressure airflow is introduced into the airflow channel, the check valve is opened, the elastic suppressor is closed, and the door plate assembly is in the close state, so that the airflow conducting space is in not communication with the cleaner outlet and the small-size powdery particles of the remaining powder are transmitted from the second cyclone unit to the airflow conducting space through the cleaner inlet and filtered by the filter net.

6. The powder recycling system according to claim 5, wherein when the air pressure generation device provides a positive pressure airflow and the positive pressure airflow is introduced into the airflow channel, the check valve is closed, the elastic suppressor is opened, and the door plate assembly is in the open state, so that the cleaner inlet is not in communication with the airflow conducting space but the airflow conducting space is in communication with the cleaner outlet, wherein when the positive pressure airflow blows the filter net, the small-size powdery particles of the remaining powder adsorbed by the filter net fall down to the cleaner outlet so as to be transmitted to the first duct through the bypass duct.

7. The powder recycling system according to claim 1, wherein the powder feeder further comprises a weight sensor or a motor torque sensor for sensing a weight of the construction powder in the powder container, wherein if the weight of the construction powder in the powder container reaches a threshold value, the remaining powder is not recycled to the powder container.

8. The powder recycling system according to claim 1, wherein the first duct comprises an upper section, a connector and a lower section, wherein the upper section is detachably connected with the lower section through the connector, wherein when the upper section is detached from the connector, the upper section of the first duct is served as a suction pipe.

9. The powder recycling system according to claim 1, wherein the first cyclone unit further comprises an additional cyclone inlet, and the cyclone inlet is normally closed, wherein if the additional cyclone inlet is opened and in communication with a powder removable device, remaining powder from the powder removable device is also recycled by the powder recycling system.

10. The powder recycling system according to claim 1, wherein the particulate filter cleaner further comprises a cleaner outlet and a bypass inlet, wherein the cleaner outlet located at a bottom of the powder collecting tank, the bypass inlet is in communication with the cleaner outlet, and the bypass inlet is normally closed, wherein if the bypass inlet is opened and in communication with a powder removable device, remaining powder from the powder removable device is also recycled by the powder recycling system.

11. A powder recycling system for recycling remaining powder from a construction chamber of a three-dimensional object forming apparatus, the powder recycling system comprising:
   a powder feeder comprising a powder container for accommodating a construction powder, wherein the powder feeder comprises a first inlet, a second inlet and a powder exhaust port, wherein the construction powder falls down to the construction chamber through the powder exhaust port, so that a constructing process is performed within the construction chamber;

a remaining powder collector comprising a guiding tank, wherein the guiding tank surrounds the construction chamber for collecting the remaining powder from the construction chamber, wherein a bottom of the guiding tank has a collector outlet;

a block powder filter comprising a filter inlet, a filter outlet and a filtering medium, wherein the filter inlet is in communication with the breaker outlet of the bridge breaker through a first duct for receiving the remaining powder, wherein after a block-type part of the remaining powder is removed by the filtering medium, the remaining powder with powdery particles is produced and outputted from the filter outlet;

a cyclone separator comprising a first cyclone unit and a second cyclone unit, wherein the first cyclone unit comprises a first cyclone inlet, a first cyclone outlet and a first powder falling port, and the second cyclone unit comprises a second cyclone inlet, a second cyclone outlet and a second powder falling port, wherein the first cyclone inlet is in communication with the filter outlet of the block powder filter through a second duct, the first cyclone outlet is in communication with the second cyclone inlet through a third duct, the first powder falling port is in communication with the first inlet of the powder feeder, and the second powder falling port is in communication with the second inlet of the powder feeder, wherein the remaining powder from the block powder filter is separated into large-size powdery particles and small-size powdery particles by the cyclone separator, the large-size powdery particles fall down to the powder feeder to be recycled as the construction powder, and the small-size powdery particles are outputted from the second cyclone outlet;

a particulate filter cleaner comprising a powder collecting tank, a covering member, a filter net, a cleaner inlet and an airflow channel, wherein the filter net is arranged between the covering member and the powder collecting tank, an upper portion of the powder collecting tank has an airflow conducting space, and the cleaner inlet is in communication with the second cyclone outlet of the cyclone separator through a fourth duct, wherein when a negative pressure airflow is introduced into the airflow channel, the small-size powdery particles of the remaining powder are transmitted from the second cyclone unit to the airflow conducting space through the cleaner inlet and filtered by the filter net, so that portions of the small-size powdery particles are suspended;

an air pressure generation device providing the negative pressure airflow, and comprising a first airflow port and a second airflow port, wherein the first airflow port is in communication with the airflow channel of the particulate filter cleaner through a fifth duct; and an electrostatic precipitator comprising a connecting port and a dust collection plate, wherein the connecting port is in communication with the second airflow port of the air pressure generation device through a sixth duct, wherein the suspended small-size powdery particles from the particulate filter cleaner are introduced into the electrostatic precipitator through the connecting port and adsorbed by electrostatic charges on the dust collection plate.

12. The powder recycling system according to claim 11, wherein the powder recycling system further comprises a bridge breaker, and the bridge breaker comprises a breaker inlet and a breaker outlet, wherein the breaker inlet is in communication with the collector outlet of the remaining powder collector, and the breaker outlet is in communication with the first duct, wherein a bridge effect of the remaining powder from the collector outlet is eliminated by the bridge breaker, so that the remaining powder is smoothly transferred to the block powder filter through the breaker outlet and the first duct.

13. The powder recycling system according to claim 12, wherein the bridge breaker further comprises a rotating lever, and the rotating lever is disposed within the bridge breaker, wherein upon rotation of the rotating lever, the remaining powder within the bridge breaker is loosened so as to be smoothly outputted from the breaker outlet.

14. The powder recycling system according to claim 12, wherein the bridge breaker further comprises a vibrator, and the vibrator is disposed within the bridge breaker, wherein upon vibration of the vibrator, the remaining powder within the bridge breaker is loosened so as to be smoothly outputted from the breaker outlet.

15. The powder recycling system according to claim 11, wherein the particulate filter cleaner comprises:
   a cleaner outlet located at a bottom of the powder collecting tank, wherein the cleaner outlet is in communication with the first duct through a bypass duct;
   a check valve located at a junction between the cleaner inlet and the airflow conducting space, wherein the check valve is selectively opened or closed according to a pressure difference between the cleaner inlet and the airflow conducting space;
   a door plate assembly disposed within the powder collecting tank, wherein if the door plate assembly is in a close state, the airflow conducting space is not in communication with the cleaner outlet, wherein if the door plate assembly is in an open state, the airflow conducting space is in communication with the cleaner outlet; and
   an airflow exhaust valve located at a top of the covering member and comprising a filtering medium, wherein the airflow exhaust valve and the airflow channel are in communication with an airflow conducting gap of the covering member, and the suspended small-size powdery particles of the remaining powder are filtered by the filtering medium and not leaked out of the airflow exhaust valve, wherein an elastic suppressor is located at a top of the airflow exhaust valve,
   wherein when the negative pressure airflow is introduced into the airflow channel, the check valve is opened, the elastic suppressor is closed, and the door plate assembly is in the close state, so that the airflow conducting space is not in communication with the cleaner outlet and the small-size powdery particles of the remaining powder are transmitted from the second cyclone unit to the airflow conducting space through the cleaner inlet and filtered by the filter net.

16. The powder recycling system according to claim 15, wherein when the air pressure generation device provides a positive pressure airflow and the positive pressure airflow is introduced into the airflow channel, the check valve is closed, the elastic suppressor is opened, and the door plate assembly is in the open state, so that the cleaner inlet is not in communication with the airflow conducting space but the airflow conducting space is in communication with the cleaner outlet, wherein when the positive pressure airflow blows the filter net, the small-size powdery particles of the remaining powder adsorbed by the filter net fall down to the cleaner outlet so as to be transmitted to the first duct through the bypass duct.

17. The powder recycling system according to claim 11, wherein the powder feeder further comprises a weight sensor or a motor torque sensor for sensing a weight of the construction powder in the powder container, wherein if the weight of the construction powder in the powder container reaches a threshold value, the remaining powder is not recycled to the powder container.

18. The powder recycling system according to claim 11, wherein the first duct comprises an upper section, a connector and a lower section, wherein the upper section is detachably connected with the lower section through the connector, wherein when the upper section is detached from the connector, the upper section of the first duct is served as a suction pipe.

19. The powder recycling system according to claim 11, wherein the first cyclone unit further comprises an additional cyclone inlet, wherein the cyclone inlet is normally closed, wherein if the additional cyclone inlet is opened and in communication with a powder removable device, remaining powder from the powder removable device is also recycled by the powder recycling system.

20. The powder recycling system according to claim 11, wherein the particulate filter cleaner further comprises a cleaner outlet and a bypass inlet, wherein the cleaner outlet located at a bottom of the powder collecting tank, the bypass inlet is in communication with the cleaner outlet, and the bypass inlet is normally closed, wherein if the bypass inlet is opened and in communication with a powder removable device, remaining powder from the powder removable device is also recycled by the powder recycling system.

* * * * *